(12) United States Patent
Costall et al.

(10) Patent No.: US 9,726,187 B2
(45) Date of Patent: Aug. 8, 2017

(54) MULTIPLE TURBOCHARGER CONTROL

(75) Inventors: Aaron William Costall, Peterborough (GB); Janette Nicholls, Peterborough (GB)

(73) Assignee: Perkins Engines Company Limited, Peterborough (GB)

( * ) Notice: Subject to any disclaimer, the term of this patent is extended or adjusted under 35 U.S.C. 154(b) by 954 days.

(21) Appl. No.: 13/989,318

(22) PCT Filed: Dec. 12, 2011

(86) PCT No.: PCT/EP2011/072485
§ 371 (c)(1),
(2), (4) Date: Jan. 10, 2014

(87) PCT Pub. No.: WO2012/076726
PCT Pub. Date: Jun. 14, 2012

(65) Prior Publication Data
US 2014/0205426 A1 Jul. 24, 2014

(30) Foreign Application Priority Data
Dec. 10, 2010 (EP) ..................................... 10194600

(51) Int. Cl.
*F02B 33/44* (2006.01)
*F04D 25/16* (2006.01)
(Continued)

(52) U.S. Cl.
CPC ............... *F04D 25/16* (2013.01); *F01N 5/04* (2013.01); *F02B 37/004* (2013.01);
(Continued)

(58) Field of Classification Search
CPC ...... F02B 37/004; F02B 37/013; F02B 37/18; F02B 37/183; F02B 37/22
(Continued)

(56) References Cited

U.S. PATENT DOCUMENTS

| 4,958,497 A | 9/1990 | Kawamura |
| 5,105,624 A | 4/1992 | Kawamura |

(Continued)

FOREIGN PATENT DOCUMENTS

| EP | 0 352 064 A1 | 1/1990 |
| EP | 1 640 583 A2 | 3/2006 |

(Continued)

OTHER PUBLICATIONS

English-language International Search Report from European Patent Office for International Application No. PCT/EP2011/072485, mailed Feb. 20, 2012.

(Continued)

*Primary Examiner* — Thai Ba Trieu
*Assistant Examiner* — Ngoc T Nguyen (57) ABSTRACT

A turbocharger system comprises: a gas input for receiving exhaust gases from an engine; a first turbocharger comprising a first compressor driven by a first turbine, arranged to be driven by received exhaust gases and providing a compressed air output defining a boost pressure a second turbocharger, arranged to be driven by exhaust gases passing through the first turbocharger or exhaust gases received at the gas input and being coupled to an electrical generator operative to provide electrical power, the first turbine not being coupled to an electrical generator; and a controller. A diversion mechanism may be configured to affect the flow of exhaust gases between the gas input and the first turbocharger. The controller may be configured to adjust the operation of the electrical generator independently from the operating mode of the associated engine, to affect the boost pressure.

13 Claims, 6 Drawing Sheets

(51) Int. Cl.
*F01N 5/04* (2006.01)
*F02B 37/013* (2006.01)
*F02B 37/14* (2006.01)
*F02B 37/18* (2006.01)
*F02B 39/10* (2006.01)
*F02B 37/00* (2006.01)

(52) U.S. Cl.
CPC ............ *F02B 37/013* (2013.01); *F02B 37/14* (2013.01); *F02B 37/18* (2013.01); *F02B 39/10* (2013.01); *Y02T 10/144* (2013.01); *Y02T 10/16* (2013.01)

(58) Field of Classification Search
USPC .................. 60/612, 602, 605.1; 123/562
See application file for complete search history.

(56) References Cited

U.S. PATENT DOCUMENTS

| | | | |
|---|---|---|---|
| 6,324,846 | B1 | 12/2001 | Clarke |
| 6,928,819 | B2* | 8/2005 | Baeuerle ................ F02B 37/18 60/612 |
| 7,451,597 | B2* | 11/2008 | Kojima .................. F02B 37/04 60/612 |
| 2005/0000217 | A1* | 1/2005 | Nau ....................... F02B 37/18 60/612 |
| 2006/0236692 | A1 | 10/2006 | Kolavennu et al. |
| 2009/0007563 | A1* | 1/2009 | Cooper ................. F02B 37/18 60/612 |
| 2009/0249786 | A1* | 10/2009 | Garrett ................. F02B 37/004 60/612 |
| 2010/0100300 | A1 | 4/2010 | Brooks et al. |
| 2012/0152214 | A1* | 6/2012 | Thorne ................ F02B 37/013 123/564 |
| 2014/0230430 | A1* | 8/2014 | Krug .................... F02B 37/004 60/600 |

FOREIGN PATENT DOCUMENTS

| | | | | |
|---|---|---|---|---|
| EP | 1 927 739 | A1 | 6/2008 | |
| EP | 2 006 507 | A1 | 12/2008 | |
| JP | 2005-9315 | | 1/2005 | |
| SE | EP 2573356 | A2 * | 3/2013 | ............ F02B 37/004 |
| WO | WO 2006/115596 | A1 | 11/2006 | |
| WO | WO 2010/039197 | A1 | 4/2010 | |

OTHER PUBLICATIONS

English-language European Search Report from the Munich Patent Office for EP 10 19 4600, date of completion of search Sep. 30, 2011.

* cited by examiner

MULTIPLE TURBOCHARGER CONTROL

TECHNICAL FIELD

The disclosure relates to a turbocharger system and a method of controlling a turbocharger system, particularly, a twin-turbocharger system incorporating electric turbo assist.

BACKGROUND

A turbocharger forms part of an engine, and comprises a turbocharger shaft driven by a turbine that rotates in response to exhaust gases from the engine. The principal purpose of the turbocharger is to compress gases using a compressor for introduction into the engine cylinders (called "boost").

Multiple turbochargers can be implemented in a sequential arrangement. This can reduce the time required to bring the turbocharger to a speed where it can function effectively, known as turbo lag. When the boost pressure is too high, it can be reduced by causing the exhaust gases to bypass one of the turbochargers. The exhaust gases may instead be diverted through a wastegate. For example, in a two-stage air system, the wastegate may be situated in the High Pressure (HP) turbocharger stage, which is the stage closer to the engine, although it can also be situated in the Low Pressure (LP) turbocharger stage or in both turbocharger stages.

Figure 1:
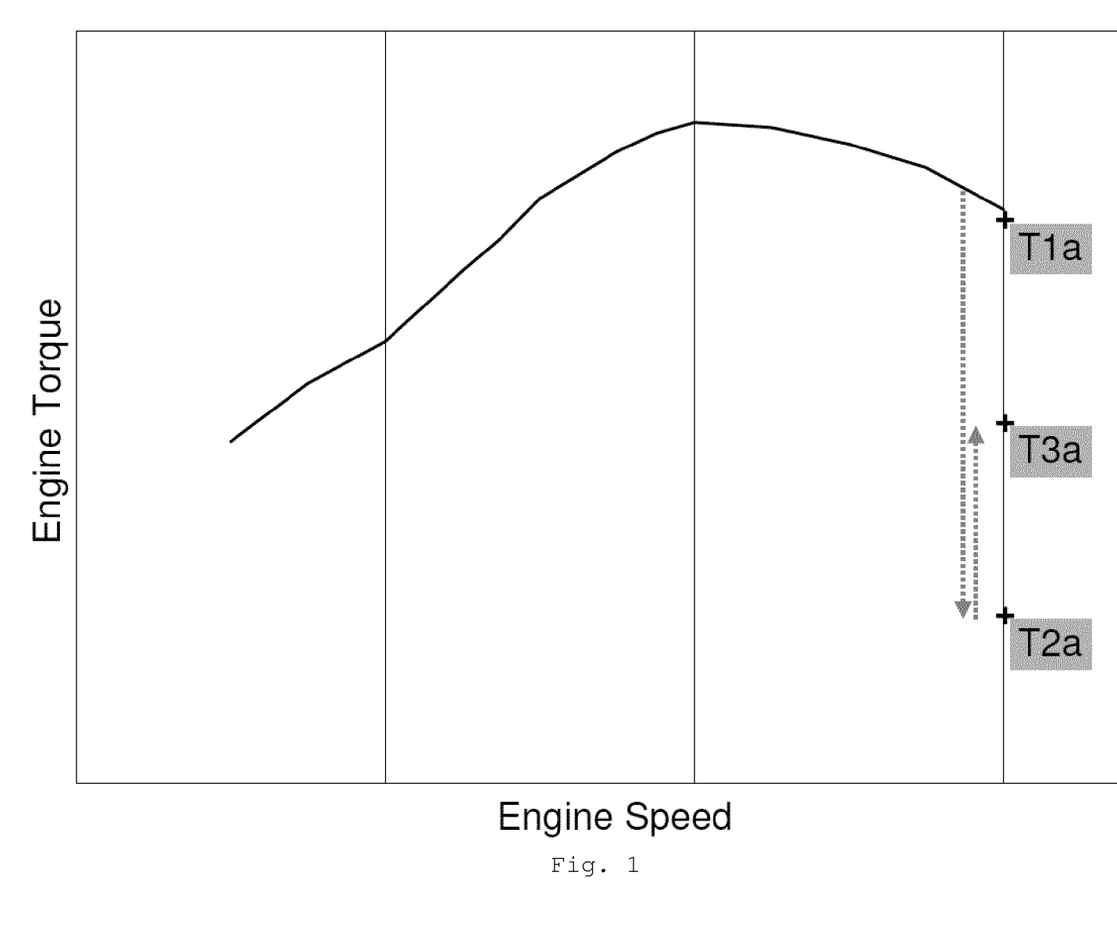
FIG. 1 shows an example torque-speed characteristic for an existing engine.

The operation of such systems may be explained using an example. Referring to FIG. 1, there is shown an example torque-speed characteristic for an existing engine using measured data. The line in this drawing may specify the maximum torque attainable as a function of engine speed.

In this example, the engine generally runs at constant speed with sudden sharp changes in the demanded load. Plotting this engine operation on the torque-speed curve, points T1a, T2a and T3a represent what happens to engine speed and load at three time points during a transient event. In this example, the transient event is when the demanded load drops to 60% of the starting torque. The starting torque is shown at T1a, the changed torque is shown at T2a and the final system equilibrium torque is shown at T3a.

Figure 2:
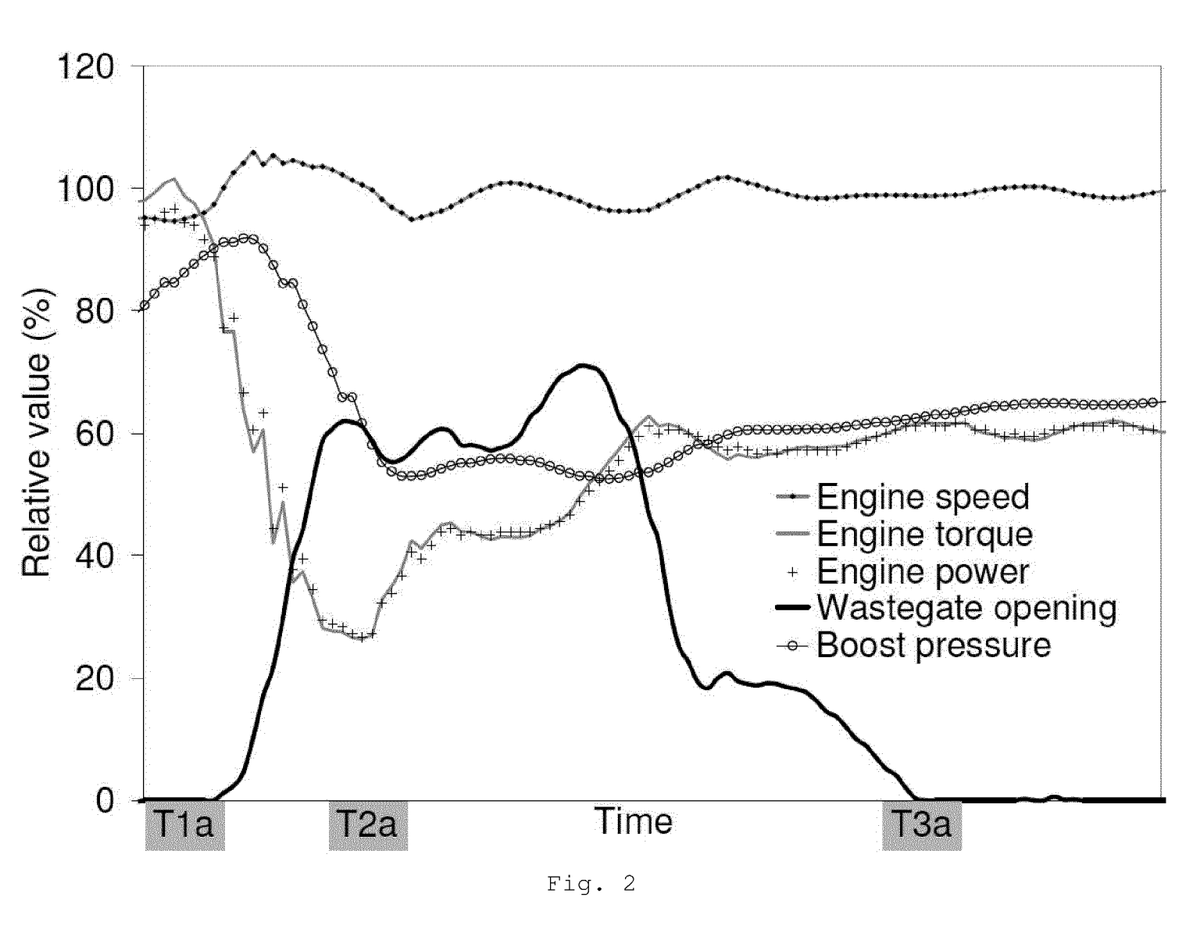
FIG. 2 illustrates examples of relevant parameters of an existing turbocharger system, when operated with the engine described by FIG. 1.

Referring next to FIG. 2, there is illustrated examples of relevant parameters of an existing turbocharger system, when operated with the engine described by FIG. 1. These may be effectively considered as real time histories of the relevant parameters for this sudden drop in demanded torque event. The abscissa may represent approximately 10 seconds of operation.

In this example, the engine speed is more or less constant, remaining within +/−5% of the rated speed. Then, after reaching a peak at T1a, the load torque is suddenly reduced. The engine power follows the torque since the speed is approximately constant.

The boost pressure being delivered at T1a exceeds that required to produce the new, lower, demanded torque. To prevent the engine accelerating due to the lower absorbed torque, the boost pressure is desirably reduced. The drop off in torque may be sensed through the rise in boost pressure.

The wastegate starts to open as a result of this sensed rise in boost pressure (as illustrated), causing the boost pressure to drop. In this way, the specific energy of the exhaust flow reaching the turbine is thus reduced and less energy is transferred to the compressor. The compressor speed and boost pressure start to decrease as the wastegate is opened.

It should be noted that the turbocharger speed is directly related to boost pressure and will likely have the same trend as the boost pressure.

Between time T2a and time T3a, the sensed boost pressure adjusts the wastegate opening until the engine torque matches the demand. By time T3a the specific energy in the exhaust flow matches that required for the desired boost level and so the wastegate closes.

An electric turbo assist (ETA) turbocharger also generates electrical energy through rotation of the shaft. The generated energy can be stored in batteries, used in auxiliary electrical systems or fed to a motor connected to the engine crankshaft to improve engine response. The ETA system provides an additional mechanism to recover energy that might otherwise be lost where the energy in the exhaust gases exceeds what is needed to drive the compressor.

Applying ETA technology to a multiple turbocharger system poses a number of difficulties, due to the system complexity. JP-2005-009315 shows such a two-stage turbocharger system with dynamo-electric machines coupled to both stages and with a by-pass valve able to cause exhaust gases to by-pass the HP stage. The by-pass valve and dynamo-electric machines are controlled on the basis of the engine speed, engine load and whether the engine is decelerating. In some cases, opening the by-pass valve is considered appropriate. However, the energy efficiency of this implementation is limited and large losses can be incurred on the HP stage at high speeds.

WO-2010/039197 relates to a hydrogen fuelled powerplant including an internal combustion engine with an afterburner in the exhaust section and a two-stage turbocharger. In one embodiment, turbine generators are coupled to both stages of the turbocharger. The turbine generators are configured to remove excess energy resulting from the afterburner operation. Low-pressure and high-pressure wastegates are used to bleed off some of the pressurized exhaust when the engine speed or load changes and the compression capability of the system detrimentally overwhelms the engine requirements.

SUMMARY OF THE DISCLOSURE

A turbocharger system comprises: a gas input for receiving exhaust gases from an associated engine having an operating mode; a first turbocharger comprising a first compressor driven by a first turbine, arranged to be driven by the exhaust gases received at the gas input and configured to provide a compressed air output defining a boost pressure; a diversion mechanism, configured to affect the flow of exhaust gases between the gas input and the first turbine on the basis of the boost pressure, such that a proportion of the energy of the received exhaust gases is provided to the first turbine; a second turbocharger, arranged to be driven by exhaust gases passing through at least one of: the first turbocharger, the first turbine not being coupled to an electrical generator; and the diversion mechanism, and being coupled to an electrical generator operative to provide electrical power; and a controller, configured to adjust the operation of the electrical generator independently from the operating mode of the associated engine, in order to affect the boost pressure so as to cause the diversion mechanism to maximise the proportion of the energy of the received exhaust gases provided to the first turbine.

A turbocharger system comprises: a gas input for receiving exhaust gases from an associated engine having an operating mode, the received exhaust gases having an associated energy; a first turbocharger comprising a first compressor driven by a first turbine and configured to provide a compressed air output defining a boost pressure, the first turbocharger being arranged such that the first turbine is driven by the exhaust gases received at the gas input without a mechanism to divert the exhaust gases received at the gas input selectively; a second turbocharger, arranged to be driven by exhaust gases passing through the first turbocharger and being coupled to an electrical generator operative to provide electrical power, the first turbine not being coupled to an electrical generator; and a controller, configured to adjust the operation of the electrical generator independently from the operating mode of the associated engine, in order to affect the boost pressure.

A turbocharger system comprises a first turbocharger and a second turbocharger, the first turbocharger comprising a first compressor driven by a first turbine and providing a compressed air output defining a boost pressure and a method of controlling such a turbocharger comprises: receiving exhaust gases from an associated engine at a gas input, the associated engine having an operating mode; controlling a diversion mechanism selectively to affect the flow of exhaust gases between the gas input and the first turbine on the basis of the boost pressure, such that a proportion of the energy of the received exhaust gases is provided to the first turbine; causing the exhaust gases passing through at least one of: the first turbocharger; and the diversion mechanism to drive a second turbocharger; operating an electrical generator driven by the second turbocharger to provide electrical power, the first turbine not being coupled to an electrical generator; and adjusting the operation of the electrical generator independently from the operating mode of the associated engine, in order to affect the boost pressure and thereby cause the diversion mechanism to maximise the proportion of the energy of the received exhaust gases provided to the first turbine.

A turbocharger system comprises a first turbocharger and a second turbocharger, the first turbocharger comprising a first compressor driven by a first turbine and providing a compressed air output defining a boost pressure and a method of controlling such a turbocharger comprises: receiving exhaust gases from an associated engine at a gas input; driving the first turbine with the exhaust gases received at the gas input, without a mechanism to divert the exhaust gases received at the gas input selectively; causing the exhaust gases passing through the first turbocharger to drive a second turbocharger; operating an electrical generator driven by the second turbocharger to provide electrical power, the first turbine not being coupled to an electrical generator; and adjusting the operation of the electrical generator independently from the operating mode of the associated engine, in order to affect the boost pressure.

BRIEF DESCRIPTION OF THE DRAWINGS

The turbocharger system and method of controlling a turbocharger system may be put into practice in various ways, one of which will now be described by way of example only and with reference to the accompanying drawings in which.

DETAILED DESCRIPTION

Figure 3:
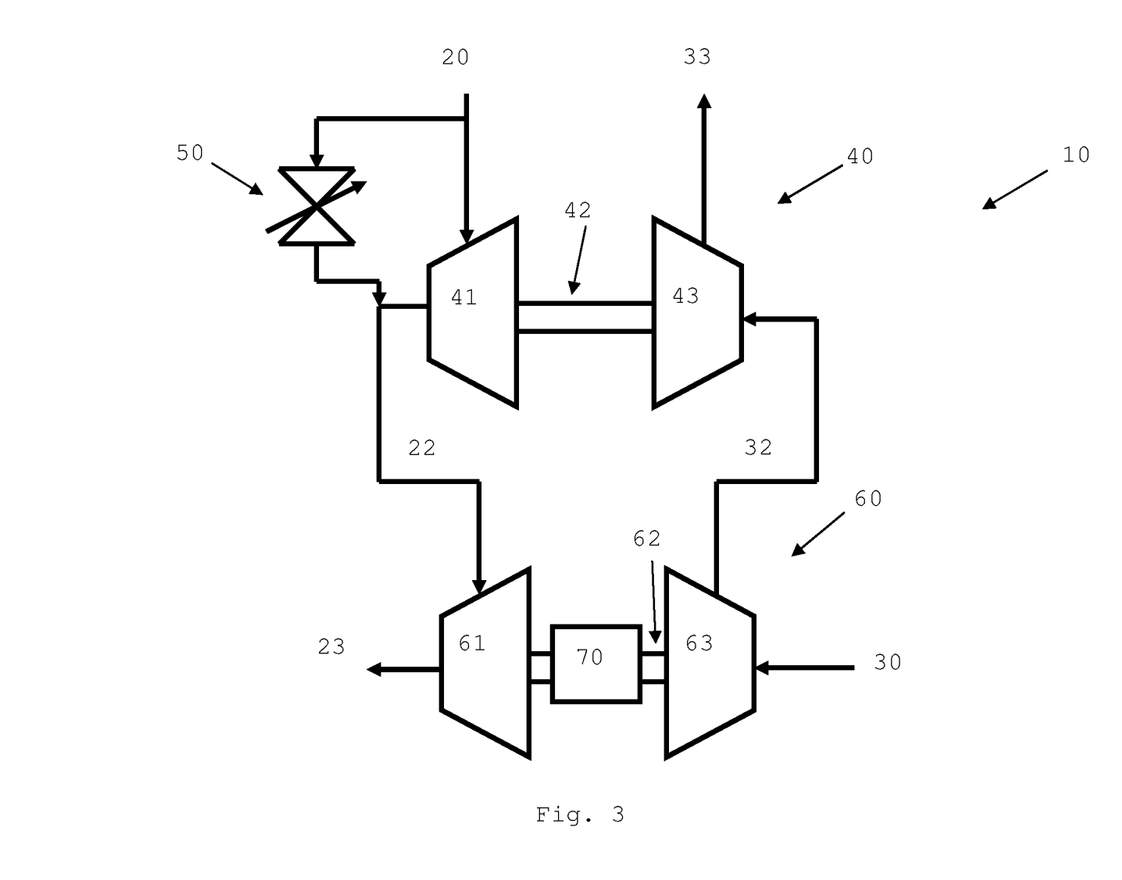
FIG. 3 shows a diagrammatic view of a first embodiment of a turbocharger system.

Referring to FIG. 3, a diagrammatic view of a turbocharger system is shown. The turbocharger system 10 may comprise: an exhaust gas inlet 20; an exhaust gas outlet 23; an air inlet 30; a compressed air outlet 33; a first turbocharger 40; a wastegate 50; a second turbocharger 60; and a turbocharger electrical machine 70. The first turbocharger 40 may comprise: a first turbine 41; a rotatable shaft 42; and a first compressor 43. The second turbocharger 60 may comprise: a second turbine 61; a second rotatable shaft 62; and a second compressor 63.

Exhaust gases from the engine may be received at the exhaust inlet 20. Under normal operating conditions, the exhaust gases may be used to drive the first turbine 41 of the first turbocharger 40, which is a HP turbocharger. This rotates the shaft 42, which causes the first compressor 43 to act.

Having passed through the first turbine 41, the exhaust gases may then be received at the second turbocharger exhaust gas inlet 22. These exhaust gases may be used to drive the second turbine 61. This causes the shaft 62 to rotate and drive the second compressor 63. Air may be received at an inlet 30 and compressed by second compressor 63. The compressed air may then be passed to the first turbocharger air inlet 32. The first compressor 43 further compresses this air and it may then be directed towards air outlet 33.

Under certain conditions, the wastegate 50 may be operated. In operation, exhaust gases received at exhaust gas inlet 20 may not all pass to the first turbine 41, but are typically instead directed partially or fully to the second turbocharger exhaust gas inlet 22, and drive the second turbine 61 instead. Such conditions may apply when the exhaust gas pressure or compressed air pressure becomes high and may therefore cause damage to the engine or make the engine run less than optimally. In practice, the exhaust gases will only fully pass through the wastegate 50 if there was a valve to shut off flow in the line feeding the turbine. Such a valve is not present in the embodiment of FIG. 3, but could be added as an option.

Typically, the condition under which the wastegate 50 will be operated may depend upon a parameter that is a function of the compressor delivery (that is, boost) pressure, which is a function of the received energy from the exhaust gases since these provide the energy for rotation of the first turbine 41, second turbine 61 or both. The boost pressure is normally measured directly. Alternatively or additionally, the rotational speed of the first turbocharger shaft 42, second turbocharger shaft 62 or both can be measured as the boost pressure is closely related to these parameters.

Different types of wastegate exist. Both older, passive wastegates, and so-called "smart" or electronic wastegates use an indication of the boost pressure to determine the degree of wastegate opening. The desired boost level (boost demand) usually relates to the ratio of air to fuel required in the combustion chambers of the engine at that particular operating point. The wastegate may be set to open when the boost pressure rises above a set pressure level. The set pressure level may be dependent upon the boost demand, or independent of the boost demand.

In the older type of wastegate, a pneumatic feed of the instantaneous boost level, usually from somewhere in the intake manifold downstream of the first compressor 43 and compressed air outlet 33, for example, after a charge cooler (not shown). It may then be fed to a wastegate actuator (not shown), in which the pressure acts on a sprung diaphragm or valve arrangement which rises or falls according to the pressure level. There is typically a linkage and lever arm which connects this to a wastegate flap valve (not shown) inside the housing of the first turbine 41.

This operation is termed "passive" because the characteristic of opening against boost pressure for the wastegate 50 is set by specifying the spring rating in the actuator.

A "smart" wastegate is similar to the older wastegate, but the characteristic of wastegate opening against boost pressure can be modified by the Engine Control Module (ECM). This may use an electronic control valve which may control the pressure level seen by the wastegate actuator. In this case, there are effectively a number of characteristics of wastegate opening against boost pressure, calibrated to correspond to different engine operating points.

There are also other additional modifications to both older and "smart" wastegates (for example, secondary ports), which essentially seek to fine-tune the shape of the wastegate opening characteristic. For example in a basic wastegate, the wastegate flap may begin to open well before maximum boost is reached (a consequence of the nature of the spring system). The modifications attempt to make the opening more of a step response (by using stepper motors or solenoid valves).

Coupled to the second turbocharger 60, there may be a turbocharger electrical machine 70. This may comprise a rotor (not shown) driven by the rotatable shaft 62 and a stator (not shown), fixed in position. This electrical machine 70 is normally operated in a generator mode, in which rotation of the second rotatable shaft 62 causes induction of a current in the stator of the electrical machine 70. Optionally, it can also be operated in a motor mode, in which a current is provided to the stator of the electrical machine 70 and this causes a force on the rotor and thus the rotatable shaft 62, thereby driving the second compressor 63. Due to the higher rotational speed of the high pressure turbocharger stage 40 in comparison with the low pressure turbocharger stage 60, no electrical machine is usually applied on this stage. For example the high pressure turbocharger stage 40 may run at around 120000 rpm, whereas the low pressure turbocharger stage 60 may operate at 80000 rpm. Nonetheless, this makes a big difference to the design of the electrical machine 70. Application of an electrical machine to the first turbocharger 40 would incur prohibitive losses due to the high speeds of the rotatable shaft 42. By rotating the turbocharger shaft slower, even by a small difference, more power may be extracted. The power extracted is a function of torque and speed. Torque increases with the diameter of the rotor, but centrifugal stress increases with the square of the speed. Eventually, a stress limitation is reached, introducing losses.

Moreover, the low pressure turbocharger stage 60 may be significantly cooler than the high pressure turbocharger stage 40. The exhaust gases may be cooler, following expansion in the high pressure turbocharger stage 40. Thus, there may be less "heat soak" into the electrical machine 70. Apart from centrifugal stress, a key limitation on the electrical machine may be that the temperature of the windings must be controlled to prevent melting.

To extract energy from the electrical machine 70 in the low pressure turbocharger 60, when the electrical machine 70 is being operated in its generator mode, the first turbocharger 40 will be required to produce a higher compressive force in order to achieve the same level of boost. Consequently, the work balance will shift to the first turbocharger 40, implying that the wastegate 50 will operate to a lesser degree. This provides more energy to the first compressor 43. This control problem may be optimised by adjusting the current drawn from the electrical machine 70 on the basis of the boost requirements and the conditions under which the wastegate 50 will operate.

Effectively, the boost pressure may be controlled by operating the electrical machine 70 as a generator, rather than actuating the wastegate 50 on the first turbocharger 40. Instead of actuating the wastegate 50, a boost pressure sensor (not shown) may control the current in the circuit of the electrical machine 70, and thus the torque extracted from the second rotatable shaft 62. A control strategy may be employed to meet the desired boost optimally by control of the current of the electrical machine 70, engine torque or both.

Specifically, for a given boost requirement, the current drawn from the electrical machine 70 may be set to a level such that operation of the wastegate 50 is minimised. This provides optimum engine thermal efficiency, since as much of the energy as possible from the exhaust gases generated by the engine is either used for providing boost or converted into electrical energy, which can be stored for later use.

This is advantageously effected in a way that is independent from the operating mode (or equivalently, point) of the engine. The operating mode may be understood as referring to the instantaneous speed and torque (load) of the engine, but the rate of change of speed or torque or both may also be understood. Moreover, for derivatives of the speed or torque or both can also be encompassed by the term operating mode.

By independent, it is not to be understood that the electrical machine 70 is not adjusted when there is a change in operating mode of the engine. A change in engine operating mode will likely cause a change in boost pressure and boost demand and adjustment of the electrical machine 70 is therefore probable. Rather, the term independently means that adjustment of the electrical machine 70 is not directly based on the operating mode of the engine, but preferably on the boost pressure. In other words, the current drawn from the electrical machine 70 may be set to minimise operation of the wastegate, irrespective of the operating mode of the engine.

In general, there is no one-to-one mapping between engine operating point and boost. Various operating points (which may be understood as combinations of speed and load) could require a single boost pressure value. Then, considering transient operation, the demanded boost could vary for the same starting engine speed and load depending on the desired end point and the response rate required. In these different contexts, the mapping between engine operating point and boost may be many-to-one (for example, in steady state operation) and one-to-many (for instance in transient operation). Moreover, the control of the electrical machine 70 may be based only on the desired boost and the determined boost pressure. The electrical machine 70 can then cause the low pressure turbocharger 60 to speed up or down accordingly, for instance by control of the current drawn using power electronics to affect the applied or absorbed torque thereby.

It may be beneficial not to use the wastegate, because it introduces mixing losses leading to poor turbine efficiency. Table 1 below summarises some example parameters for a turbocharger system with the wastegate open or shut, but with the same mass flow in either case. In other words, it reflects operation of the turbocharger system when the engine is operated at a constant speed.

TABLE 1

| Variable | Wastegate open | Wastegate shut |
|---|---|---|
| Exhaust gas inlet pressure (kPa) | 381.6039 | 384.9759 |
| Exhaust gas inlet temperature (K) | 947.84 | 956.05 |
| Mass flow (kg/s) | 0.18733 | 0.18733 |
| Exhaust gas outlet pressure (kPa) | 221.5228 | 217.9665 |
| Exhaust gas outlet temperature (K) | 859.79 | 851.99 |
| Ratio of inlet to outlet pressure | 1.722639385 | 1.77 |
| Isentropic efficiency | 0.64547935 | 0.725597393 |
| Isentropic efficiency (%) | 64.54793496 | 72.55973931 |

In this example, a drop in turbine isentropic efficiency of 8 percentage points is predicted between turbine operation with wastegate shut and with wastegate open, for the same total mass flow rate. This is energy that cannot be recovered by the LP turbine.

The efficiency of the electrical machine 70 as a generator may be significantly greater than that of the wastegate or other diversion mechanism (although likely less than 100%). Efficiencies of typically greater than 95% can be reasonably expected, especially for low speeds. At higher speeds, the efficiency of the electrical machine 70 may be reduced.

Implementation of the electrical machine 70 on the low pressure turbocharger stage 60 rather than the high pressure turbocharger stage 40 is beneficial to the overall system efficiency. Lower rotational speed in the low pressure turbocharger stage 60 imply greater efficiency of the electrical machine 70, as discussed above. For example, a 13 percentage point improvement in efficiency may be possible by dropping from 140000 rpm to 80000 rpm. Efficiencies greater than 90% may be reasonably expected, which is a significant improvement in comparison with previous wastegate operation.

Figure 4:
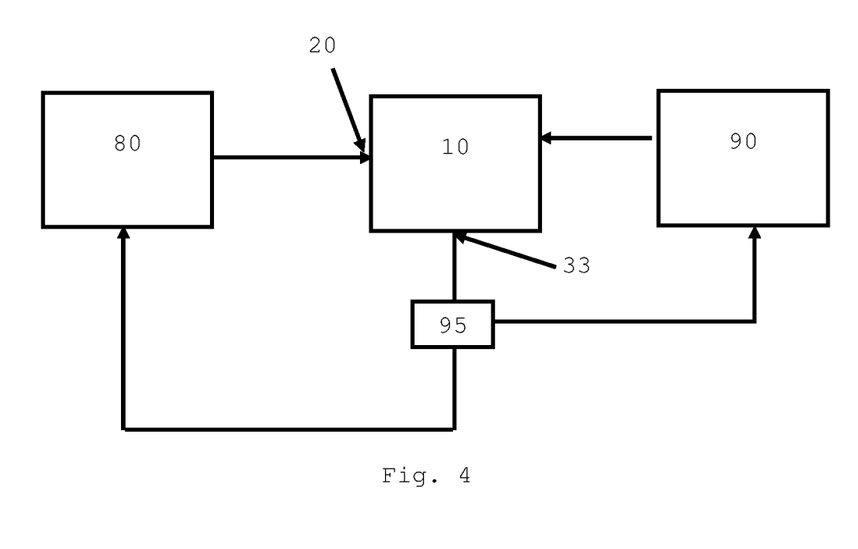
FIG. 4 shows a diagrammatic view of an engine system for use with a turbocharger system.

Referring next to FIG. 4, there is shown a diagrammatic view of an engine system for use with a turbocharger system. The engine system may comprise: an engine 80; the turbocharger system 10; a controller 90; and a sensor 95.

The engine 80 may provide exhaust gases to the exhaust gas inlet 20 of the turbocharger system 10. The turbocharger system 10 may then provide compressed air through compressed air outlet 33. The pressure of the compressed air may be determined by sensor 95 and this may be passed to controller 90. The controller 90 may then control the turbocharger electrical machine 70, as described above, in order to minimise operation of the wastegate 50.

The controller 90 may be a supervisory ETA controller that determines the torque level to be electrically extracted from (in generating mode) or applied to (in motoring mode) the second turbocharger shaft 62 of the turbocharger system 10. In terms of power electronics, the supervisory ETA controller adjusts the level of electrical current to be used by the turbocharger electrical machine 70. Like the wastegate system, the ETA controller may use a measurement of boost pressure (that is, pressure of gas at or downstream from the compressed air outlet 33, for example downstream from the charge cooler), comparing it against desired boost pressure, to decide whether the second turbocharger shaft 62 needs to be slowed down (to reduce boost) or speeded up.

A benefit of the ETA system is that the same required effect (that is, boost control) is achieved, but with increased energy efficiency. Flow across the wastegate 50 leads to wastage of the energy in the exhaust gases when a lower level of pressure is required than that which could be achieved. By preventing operation of the wastegate 50, this loss is minimized. Conversely, the proportion of the energy of the exhaust gases received at the exhaust gas inlet 20 that reaches the first turbocharger 40 is maximised. This proportion is desirably 100%, but in some cases it can be at least 95%, 90%, 75%, 50%, 25% or even less, depending on the state of the engine and turbocharger system.

The supervisory ETA controller can provide similar functionality to that of a "smart" wastegate. In other words, the relationship between the power drawn from turbocharger electrical machine 70 and the boost level or other parameter may be controlled by the ECM, in a similar fashion to the way that the relationship between operation of a "smart" wastegate and the boost level may be controlled.

Although an embodiment of the disclosure has been described above, the skilled person will contemplate various modifications. For example, the turbocharger electrical machine 70 can be implemented in various different ways.

In the above disclosure, the boost pressure has been used for control of the wastegate 50 and the electrical machine 70. However, the skilled person will appreciate that other parameters can be used, particularly for control of the electrical machine. Typically, the parameter is a function of the energy of the exhaust gases received at the gas inlet 20. Although a sensor 95 may be used to measure the parameter directly, the parameter may alternatively or additionally be provided by another part of the system, for example, by an ECM.

Wastegate 50 can be a "smart" wastegate. Then, an alternative method for controlling the turbocharger electrical machine 70 to that proposed above may be to use a physical measurement from the wastegate 50 to determine the current level of torque applied to the second turbocharger shaft 62.

A wastegate is typically internal to a turbocharger and may comprise a short passage within the turbine housing from the volute to the exit, bypassing the rotor, and may be controlled by a plate type valve. However, an external wastegate (which may be referred to as a bypass valve) may use extra ducting in the exhaust manifold that is usually completely separate from the turbocharger. This may re-route some exhaust flow from upstream of the turbine to downstream of the turbine. An internal wastegate may not need to open a great deal but this may create a strong throttling effect leading to very high velocity around the valve. In practice, this usually disturbs the flow entering the turbine wheel (Table 1 above indicates how this results in reduced turbine efficiency). The external wastegate or bypass valve is by comparison normally more efficient and may cause less disturbance to the exhaust flow, at the usual cost of extra ducting and consequently trickier packaging. However, either method generally introduces energy losses because valves are used to direct the flow of gas.

Figure 5:
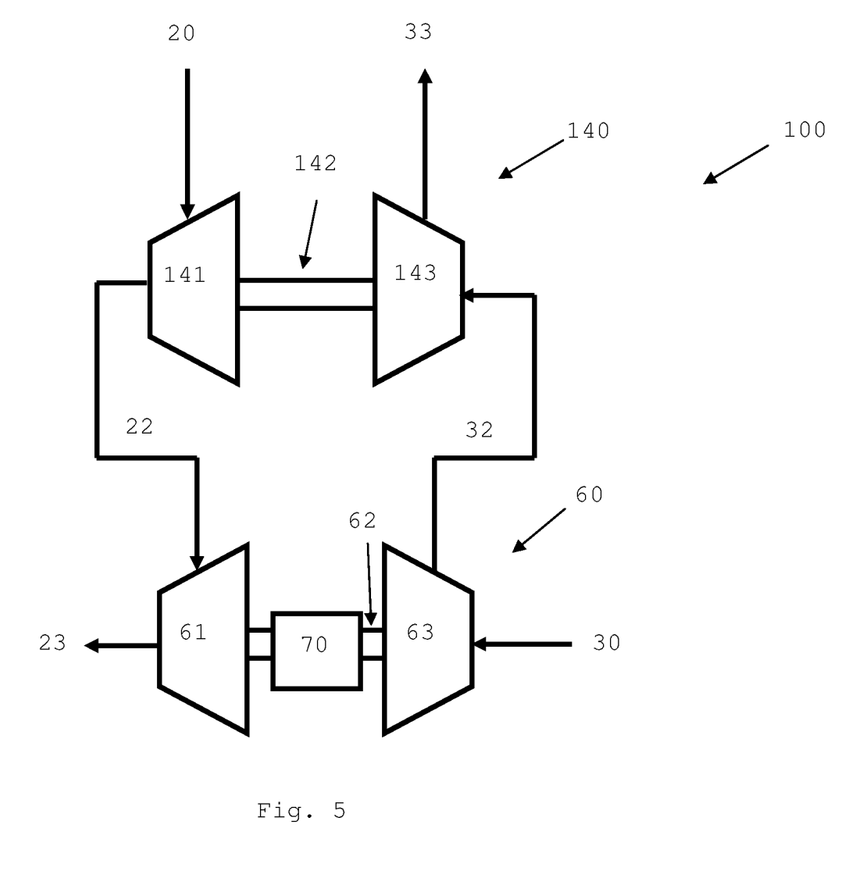
FIG. 5 shows a diagrammatic view of a second embodiment of a turbocharger system.

Although the above considers a turbocharger system using a wastegate, an alternative mechanism for controlling the flow of energy between the first turbocharger and the second turbocharger can be employed. Referring next to FIG. 5, there is shown a second embodiment of a turbocharger system 100. Where the same features are shown as in FIG. 1, identical reference numerals have been employed.

In this embodiment, a Variable Geometry Turbocharger (VGT) may be used in addition to or instead of a wastegate 50. The first turbocharger 140 may be implemented as a VGT. The first turbocharger 140 may comprise a first turbine 141 and a first compressor 143. Otherwise, the turbocharger system 100 may have the same features as the turbocharger system 10 shown in FIG. 1.

The skilled person will also recognise that the turbocharger system 100 that uses the VGT first turbocharger 140 may replace the turbocharger system 10 shown in FIG. 2. In that case, the controller 90 may control the turbocharger electrical machine 70 in order to affect the operation of VGT first turbocharger 140, as will be explained below.

Where VGT systems are used, they typically supplant the need for a wastegate. Boost control may be achieved by changing the angles of the vanes in the VGT between and open and closed positions. For instance, at times of excess boost (where the boost pressure exceeds a desired level), the vanes can be opened, meaning less blockage to the exhaust flow. A blockage increases the speed of the exhaust gases and causes a higher proportion of their energy to be transferred to the turbine of the turbocharger. Thus when the vanes are open, the specific energy arriving at the turbine decreases and less energy is transferred to the compressor. The vane angle may therefore be controlled on the basis of a condition, similar to that controlling a wastegate. This condition may again be based on a parameter that is a function of the energy of the received exhaust gases, as explained above.

Although use of a VGT is usually more energy efficient than a wastegate, it can be less efficient than a fixed geometry turbine, dependent upon the setting of the vanes. Maximum efficiency is likely achieved when the vane angles are in the middle of their range and efficiency drops off as they move towards fully closed or fully open positions.

A control method according to the disclosure could be applied to maintain VGT vane angle within the most efficient vane angle range.

A wastegate, VGT or other such mechanism for diverting the flow of exhaust gases may cause a proportion of the energy of the received exhaust gases to be provided to the first turbocharger. This proportion can be varied between 0% and 100% inclusive. As noted above, providing 0% of the received exhaust gases to the first turbocharger is unusual though.

The skilled person will also recognise that embodiments of the present invention can be realised in which no wastegate, VGT or other diversion mechanism is employed. Control of the electrical machine 70 may supplant the need for a diversion mechanism.

Here, the LP turbocharger receives exhaust gases from the HP turbocharger, with no possibility for the exhaust gases to bypass the HP turbocharger. The turbocharger electrical machine 70 is controlled independently from the operating mode of the associated engine, in order to affect the boost pressure. This may be done on the basis of a parameter that is a function of the energy of the received exhaust gases, such as the pressure at the compressed gas outlet 33, that is the boost pressure.

The turbocharger electrical machine 70 may be controlled on the basis of this parameter, for example in order to alleviate or avoid the condition of this pressure exceeding a set level. Nevertheless, a wastegate 50 or bypass valve (not shown) is preferable in such systems, if only to act as safety feature to prevent excess boost or over-speeding in the event of failure of the electronics operating the turbocharger electrical machine 70.

Figure 6:
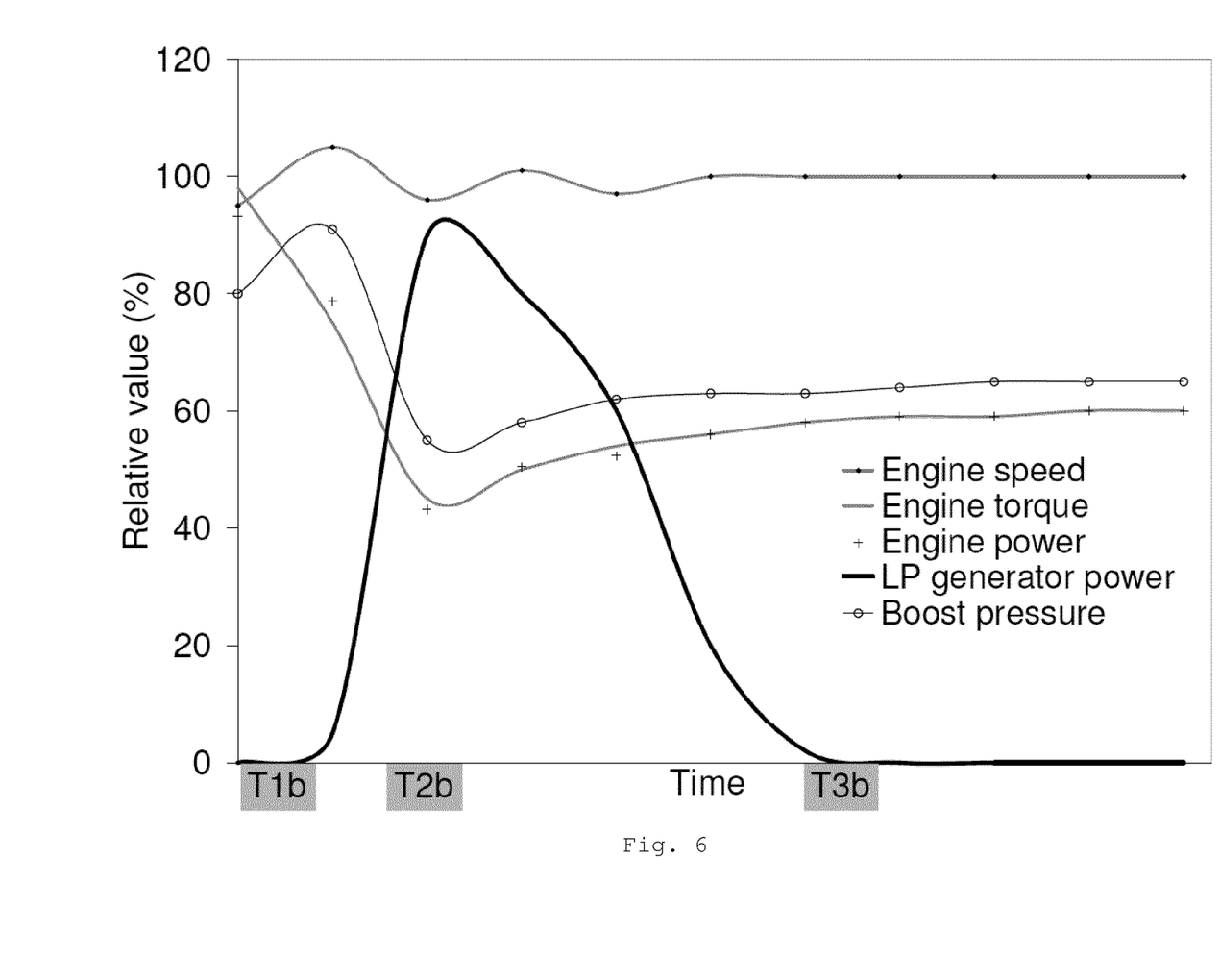
FIG. 6 illustrates examples of relevant parameters of a turbocharger system for instance in accordance with FIG. 3, 4 or 5, when operated with the engine described by FIG. 1.

Referring now to FIG. 6, there are illustrated examples of relevant parameters of a turbocharger system for instance in accordance with FIG. 3, 4 or 5, when operated with the engine described by FIG. 1. These are similar parameters to those shown in FIG. 2 for comparison purposes. These may be effectively considered as expected time histories of the relevant parameters for the same sudden drop in demanded torque event. The abscissa may again represent approximately 10 seconds of operation.

It should be noted that the parameters shown in FIG. 6 are based on simulations, modelling the real world situation. They may be applicable to the designs shown in FIGS. 3 and, but they might more readily be understood in the context of the variant discussed above in which no diversion mechanism, such as wastegate or VGT is employed.

In this example, the engine speed is essentially constant, remaining within +/−5% of the rated speed. After reaching a peak at time T1b, the load torque is suddenly reduced. The engine power follows the torque since the speed is approximately constant.

The boost pressure being delivered at time T1b exceeds that required to produce the new, lower, demanded torque. To prevent the engine accelerating due to the lower absorbed torque, the boost pressure is desirably reduced. The drop off in torque may be sensed through the rise in boost pressure.

The electrical generator 70 of the second turbocharger 60 (the LP stage) is operated to absorb energy from the shaft 62 of the second turbocharger 60 by using associated power electronics to set the corresponding current level. This causes the boost pressure to drop. In this way, the energy transferred from the turbine 61 to the compressor 63 is thus reduced. The compressor speed and boost pressure start to decrease as more power is absorbed by the electrical generator. It should be noted that the turbocharger speed may be directly related to boost pressure, so these two parameters will likely have the same trend.

Between time T2b and time T3b, the sensed boost pressure adjusts the power absorbed by the electrical machine 70 until the engine torque matches the demand. By time T3b the specific energy in the exhaust flow matches that required for the desired boost level, so the level of power absorbed drops to zero.

The timescales in FIGS. 2 and 6 may be understood as being the same. Comparing FIG. 6 to FIG. 2 shows that time T3b occurs sooner after time T1b than time T3a occurs after time T1a. In FIG. 6, the energy being removed from the exhaust gas flow by the electrical machine 70 is known via instrumentation of associated power electronics. In FIG. 2, the energy removed from the exhaust flow by the wastegate is not known (whether it is a passive or "smart" wastegate). In view of these differences, the method of controlling boost using the electrical generator may be more precise and the target torque may be achieved more rapidly than by using a wastegate. The efficiency improvements discussed above are therefore manifest.

Thus, it should be clear that control over the boost may be effected by the electrical machine 70 without the need to operate (or even include) a diversion mechanism, such as a wastegate or VGT.

The invention claimed is:
1. A method of controlling a turbocharger system comprising a first turbocharger and a second turbocharger, the first turbocharger comprising a first compressor driven by a first turbine and providing a compressed air output defining a boost pressure and the second turbocharger comprising a second compressor driven by a second turbine, the method comprising:
receiving exhaust gases from an associated engine at a gas input;
controlling at least one of a wastegate and an arrangement of adjustable vanes in the first turbocharger selectively to affect the flow of exhaust gases between the gas input and the first turbine on the basis of the boost pressure, such that a proportion of the energy of the received exhaust gases is provided to the first turbine;
driving the second turbine with the exhaust gases passing through at least one of:
the first turbine; and
the at least one of a wastegate and an arrangement of adjustable vanes;
operating an electrical generator driven by the second turbine to provide electrical power, the first turbine not being coupled to an electrical generator; and
adjusting the operation of the electrical generator by adjusting an amount of electrical power drawn from the electrical generator as a function of the boost pressure so as to maintain the boost pressure below a set pressure level, in order to increase the proportion of the energy of the received exhaust gases provided to the first turbine.

2. The method of claim 1, wherein
controlling a wastegate operates to direct exhaust gases received at the gas input to bypass the first turbine; and
controlling an arrangement of adjustable vanes in the first turbine adjusts the proportion of the energy of the received exhaust gases that is provided to the first turbine.

3. The method of claim 1, further comprising:
receiving a boost demand from the associated engine;
adjusting the operation of the electrical generator to affect the boost pressure towards the boost demand; and
determining the set pressure level independently from the received boost demand.

4. A turbocharger system comprising:
a gas input for receiving exhaust gases from an associated engine having an operating mode, the received exhaust gases having an associated energy;
a first turbocharger comprising a first compressor driven by a first turbine and configured to provide a compressed air output defining a boost pressure, the first turbocharger being arranged such that the first turbine is driven by the exhaust gases received at the gas input without a mechanism to selectively divert the exhaust gases received at the gas input;
a second turbocharger comprising a second compressor and a second turbine, arranged to be driven by exhaust gases passing through the first turbine and being coupled to an electrical generator operative to provide electrical power, the first turbine not being coupled to an electrical generator; and
a controller, configured to adjust the operation of the electrical generator, in order to affect the boost pressure by adjusting current in a circuit of the electrical generator based on the boost pressure so as to maintain the boost pressure below a set pressure level.

5. The turbocharger system of claim 4, further comprising a sensor, arranged to measure the boost pressure and wherein the controller is configured to receive a boost demand from the associated engine and to adjust the operation of the electrical generator to affect the boost pressure towards the boost demand.

6. The turbocharger system of claim 4, comprising an engine controller, arranged to adjust the set pressure level independently from the boost demand.

7. The turbocharger system of claim 4, wherein the controller is configured to adjust the operation of the electrical generator by adjusting a level of electrical power drawn from the electrical generator.

8. The turbocharger system of claim 4, wherein the second compressor is configured to:
receive air at an air inlet to the second compressor;
compress the air received at the air inlet to the second compressor; and
direct the compressed air to an air inlet to the first compressor.

9. The turbocharger system of claim 8, wherein the first compressor of the first turbocharger is configured to receive the compressed air from the second compressor of the second turbocharger and further compress the air to provide the compressed air output defining a boost pressure.

10. A turbocharger system, comprising:
a gas input configured for receiving exhaust gases from an associated engine having an operating mode;
a first turbocharger comprising a first compressor and a first turbine, said first compressor driven by said first turbine, said first turbine arranged to be driven by the exhaust gases received at the gas input and said first turbocharger configured to provide a compressed air output defining a boost pressure;
at least one of a wastegate and an arrangement of adjustable vanes in the first turbocharger, configured to affect the flow of exhaust gases between the gas input and the first turbine on the basis of the boost pressure, such that a proportion from 0% to 100% of the energy of the received exhaust gases is provided to the first turbine;
a second turbocharger comprising a second compressor and a second turbine, arranged to be driven by exhaust gases passing through at least one of the first turbine and the at least one of a wastegate and an arrangement of adjustable vanes, and being coupled to an electrical generator operative to provide electrical power, the first turbine not being coupled to an electrical generator;
and a controller, configured to adjust the operation of the electrical generator, in order to affect the boost pressure so as to cause the at least one of a wastegate and an arrangement of adjustable vanes to increase the proportion of the energy of the received exhaust gases provided to the first turbine, wherein the controller is configured to receive a boost demand from the associated engine and to adjust the operation of the electrical generator to affect the boost pressure towards the boost demand by adjusting current drawn from the electrical generator so as to maintain the boost pressure below a set pressure level.

11. The turbocharger system of claim 10, wherein the wastegate is configured, in operation, to direct exhaust gases received at the gas input to bypass the first turbine; and the arrangement of adjustable vanes is configured to adjust the proportion of the energy of the received exhaust gases that is provided to the first turbine.

12. The turbocharger system of claim 10, further comprising an engine controller, arranged to adjust the set pressure level independently from the boost demand.

13. The turbocharger system of claim 10, wherein the controller is configured to adjust the operation of the electrical generator by adjusting a level of electrical power drawn from the electrical generator.

\* \* \* \* \*